(12) United States Patent
Geary et al.

(10) Patent No.: US 12,240,073 B2
(45) Date of Patent: Mar. 4, 2025

(54) TOOL CHANGER

(71) Applicant: Delaware Capital Formation, Inc., Wilmington, DE (US)

(72) Inventors: James W. Geary, Pawcatuck, CT (US); Benjamin J. Jennings, Kent, WA (US); Jeffery J. Mruzik, Livonia, MI (US)

(73) Assignee: Stabilus Motion Controls GmbH, Langenfeld (DE)

(*) Notice: Subject to any disclaimer, the term of this patent is extended or adjusted under 35 U.S.C. 154(b) by 827 days.

(21) Appl. No.: 17/488,377

(22) Filed: Sep. 29, 2021

(65) Prior Publication Data
US 2023/0102018 A1 Mar. 30, 2023

(51) Int. Cl.
*B23Q 3/155* (2006.01)
*B25J 15/04* (2006.01)
*B25J 19/02* (2006.01)

(52) U.S. Cl.
CPC ........ *B23Q 3/1554* (2013.01); *B25J 15/0425* (2013.01); *B25J 15/0433* (2013.01); *B25J 19/02* (2013.01); *B23Q 2003/155407* (2016.11)

(58) Field of Classification Search
CPC .... B25J 15/0425; B25J 15/0433; B25J 15/04; B25J 15/0491; B25J 15/10; B25J 19/02; B23B 31/39; B23B 31/16279; B23B 31/16195
See application file for complete search history.

(56) References Cited

U.S. PATENT DOCUMENTS

| | | | |
|---|---|---|---|
| 3,664,588 A | 5/1972 | Mitchell et al. | |
| 4,317,427 A | 3/1982 | Turner | |
| 4,479,673 A | 10/1984 | Inaba et al. | |
| 4,530,636 A | 7/1985 | Inaba et al. | |
| 4,637,121 A | 1/1987 | Wortmann | |
| 4,664,588 A | 5/1987 | Newell et al. | |
| 4,685,687 A | 8/1987 | Hall et al. | |
| 4,944,629 A | 7/1990 | Peveto | |
| 4,987,676 A * | 1/1991 | Amorosi | H05K 13/0413 29/740 |
| 5,044,063 A | 9/1991 | Voellmer | |
| 5,219,318 A | 6/1993 | Vranish | |

(Continued)

FOREIGN PATENT DOCUMENTS

| | | |
|---|---|---|
| JP | S61-265290 A | 11/1986 |
| JP | H05-169383 A | 7/1993 |
| JP | 2014-188616 A | 10/2014 |

*Primary Examiner* — Daniel J Wiley
(74) *Attorney, Agent, or Firm* — Harness, Dickey & Pierce, P.L.C.

(57) ABSTRACT

A tool changer 30 with a master half 32 and tool half 34. A securing mechanism has a clasp 70 and a cam 72. The clasps 70 move between a release position and a grasping position. In the grasping position, the master 32 and tool halves 34 are secured together with one another. The cam 72 moves the clasps 70 between the release and grasping positions. From a release position, the master half 32 engages the tool half 34. The master half 32 moves laterally with respect to the tool half 34. This, in turn, moves the cam 72, and thus the clasps, from their release positions to their grasping positions. In the grasping position, the clasps 70 grasp the tool half 34, the cam locks 72 in its grasping position and the master 32 and tool 34 halves secure with one another.

20 Claims, 15 Drawing Sheets

(56) References Cited

U.S. PATENT DOCUMENTS

| | | |
|---|---|---|
| 5,261,758 A | 11/1993 | Vranish |
| 5,320,395 A | 6/1994 | Gernhardt et al. |
| 5,848,795 A | 12/1998 | Masatsugu et al. |
| 6,612,589 B2 | 9/2003 | Saito |
| 7,794,171 B2 | 9/2010 | Park et al. |
| 8,221,296 B2 | 7/2012 | Hildebrandt et al. |
| 8,545,374 B2 | 10/2013 | Van de Vosse et al. |
| 8,857,821 B2 | 10/2014 | Norton et al. |
| 2021/0178608 A1 | 6/2021 | Geary |

\* cited by examiner

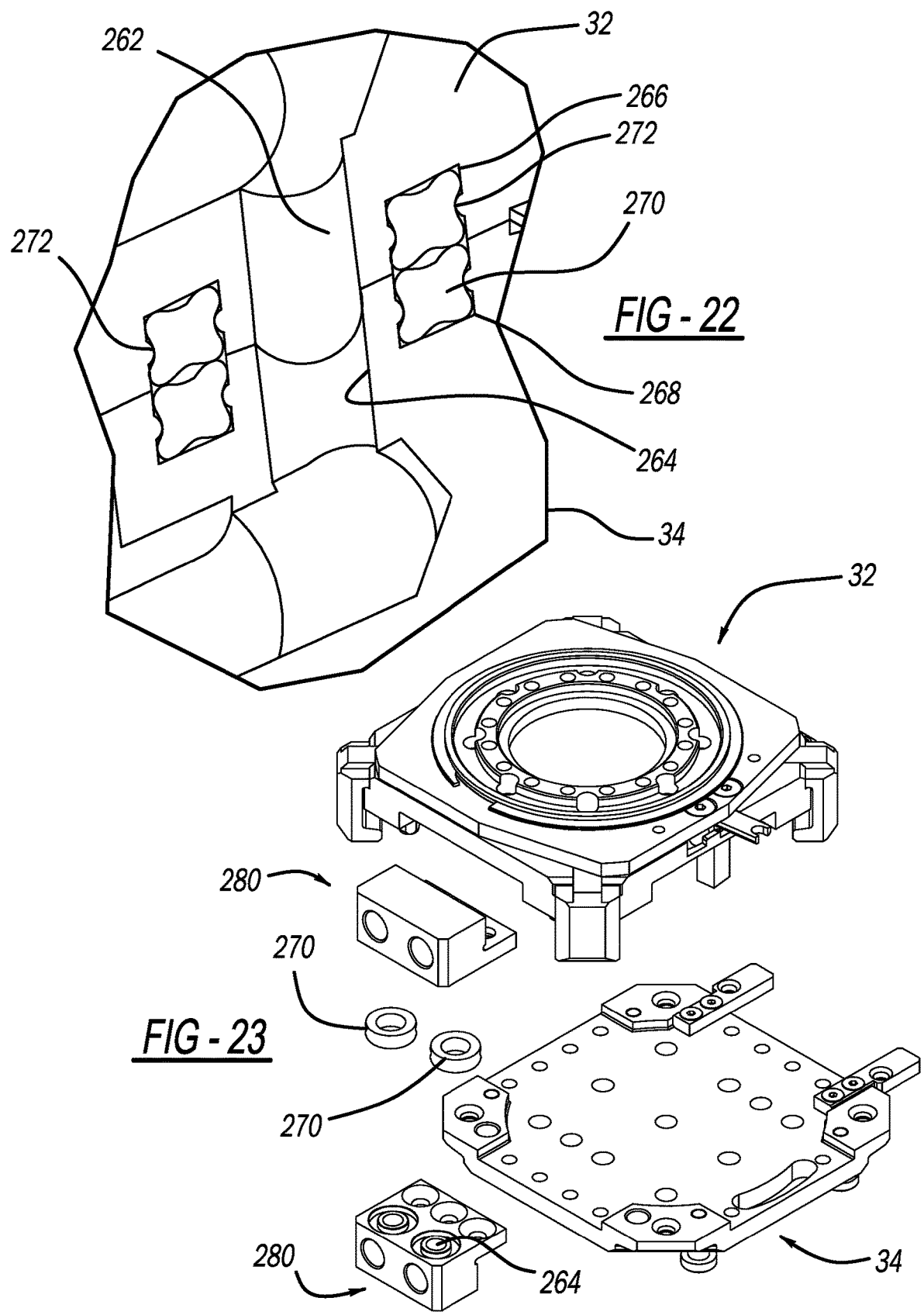

TOOL CHANGER

FIELD

The present disclosure relates to robotic tools and, more particularly, to a tool changer coupling tools with a robot.

BACKGROUND

In prior designs, a center lock locks the tool changer with an expanding ball connection between the tool and master halves being driven by an air cylinder. This requires the locking mechanism to be located near the center of the device. Between the size of the air cylinder and locking features of both halves, these tool changers tend to be quite tall. This added height diminishes the moment carrying capability of the robot by this increased length. The weight of the tool changer reduces the effective payload and moment capacity of the robot.

In addition, the locking located at the center has less capability to resist moment loading. This is due to a shorter moment arm between opposing members of the lock mechanism being less able to resist the loading applied by the robot to the tooling via the tool changer. This results in a lack of stiffness in the tool changer that enables effector tooling to deflect (sag) more easily, reducing the tool effectiveness.

The size of the tool changer is also affected by the lack of stiffness of the locking balls. This is due to the fact that they are poorly located in the center and mate via point contact between the master and tool halves. This causes concentrated stresses that can cause brinelling of the balls and mating couplers. In addition, the point contact also does not resist deflection effectively.

Some manufacturers have tried to increase the contact area with contour ball sockets. Others have tried with expanding micro wedges to increase the contact area. Regardless, even with greater contact area, the point of application is near the center of the device. Thus, this inherently lacks stiffness due to the shortened moment arm.

Furthermore, most robotic tool changers require a custom adapter plate to mount the tool changer to the desired robot. This adapter adds costs, weights and height to the assembled and mounted tool changer. This exacerbates the previously mentioned problems.

Further, these automatic changers utilize pneumatic air cylinders in the master half to lock and unlock the robot to the tool. Many different types of so called fail safe designs exist. If air pressure is lost, due to a broken air hose or the like, the master half does not let go of the tool. These fail safe designs consist of springs and detents that are effective if air pressure is lost. However, it does not protect from programming signal errors that switches the value to unlock the tooling and thus drop the tool.

The inherent problem with this arrangement is that it is possible and quite common for a robot programming error to happen. This causes pneumatic lock/unlock valves to actuate unexpectedly. This, in turn, decouples the tool half from the master half. This may lead to an expensive tool being destroyed due to dropping the tool from the robot. This functional problem is inherent in nearly all automatic tool changers on the market today.

Additionally, there are many applications where the tool changing is done by a human operator. No current designs can operate as both a manual tool changer and an automatic one. There are circumstances where, if a tool changer's pneumatic piston seal leaks, it is impossible to open due to failsafe devices mentioned above. In situations like this, the tool changer must be cut off of the robot as mounting screws are inaccessible when the two halves are coupled and locked.

U.S. Patent Application No. 2021/0178608 published Jun. 17, 2021, assigned to the same assignee as the present application overcomes the above problems of the prior art. However, designers strive to improve the art. Accordingly, the present application is such an application.

SUMMARY

Accordingly to a first aspect of the disclosure, a tool changer comprises a master half and a tool half. The master half is coupled with a robot. The tool half is coupled with a tool. A first mating member is on a master half and a second mating member is on the tool half. The first and second mating members include a recess or a projection, respective for enabling the first and second mating members to mesh with one another. A securing mechanism secures the master half and tool half with one another. The securing member includes at least one clasp moving between a release position and a grasping position. A cam plate moves the clasp(s) between the release position and the grasping position. When the clasp is in a grasping position, the master half and the tool half are secured with one another. A lock is coupled with the cam plate. When the master half and the tool half are to be secured together, the master half approaches the tool half. The master half engages with the tool half for securement. The lock is actuated and actuates the cam plate which moves the clasp from its released position to its grasping position. The lock then moves into a locked position thereby locking the master half and tool half together. The lock may be manually actuated. Here, a handle is coupled with the cam plate and the lock release is coupled with the handle to actuate the lock. Alternatively, the lock may be automated. Here, the lock includes a fluid-operated piston assembly coupled with the tool changer. The piston assembly includes a movable piston with an arm coupled with the lock. One or more sensors may be used to sense the position of the movable piston.

According to a second aspect of the disclosure, a tool changer comprises a master half and a tool half. The master half is coupled with a robot. The tool half is coupled with a tool. A first mating member is on a master half and a second mating member is on the tool half. The first and second mating members include a recess or a projection, respective for enabling the first and second mating members to mesh with one another. A securing mechanism secures the master half and tool half with one another. The securing member includes at least one clasp moving between a release position and a grasping position. A cam plate moves the clasp(s) between the release position and the grasping position. When the clasp is in a grasping position, the master half and the tool half are secured with one another. A lock is coupled with the cam plate. When the master half and tool half are to be secured together, the master half approaches the tool half that is coupled with a tool retained in a storage nest. When the master half engages with the tool half for securement, the lock couples with the storage nest and after the lock is coupled, the lock is actuated and actuates the cam plate and moves the clasp(s) from its released position to its grasping position. The lock moves into a locked position thereby locking the master half and tool half together. A lock sensor determines the position of the lock during operation. The lock sensor includes one or more sensors to sense the position of the lock during actuation. The lock sensor is electrically coupled with the robotic controls.

Accordingly to a third aspect of the disclosure, a tool changer comprises a master half and a tool half. The master half is coupled with a robot. The tool half is coupled with a tool. A first mating member is on a master half and a second mating member is on the tool half. The first and second mating members include a recess or a projection, respectively for enabling the first and second mating members to mesh with one another. A securing mechanism secures the master half and tool half with one another. The securing member includes at least one clasp moving between a release position and a grasping position. A cam plate moves the clasp(s) between the release position and the grasping position. When the clasp is in a grasping position, the master half and the tool half are secured with one another. A lock is coupled with the cam plate. When the master half and tool half are to be secured together, the master half approaches the tool half that is coupled with a tool and retained in a storage nest. When the master half engages with the tool half for securement, the lock couples with the storage nest and after the lock is coupled, the lock is actuated and actuates the cam plate and moves the clasp(s) from its released position to its grasping position. The lock moves into a locked position thereby locking the master half and tool half together.

A vacuum or compression connection may be included between the master half and the tool half with a bore in the master half and a bore in the tool half in fluid communication. A channel outside of the bore receives seals so that in operation, the seals are in a face to face seal to seal contact. The channels may include a snap in feature to retain the seal in the channel. The seal may be an O-ring, a quad ring, a rectangular ring, or the like. Additionally, a channel may be in one of the bores to receive a seal. A tube extends from the opposing bore. When the master half and tool half are coupled together, the tube extends into the seal so that the seal is not broken if the master half and tool half separate slightly under the load.

According to a fourth aspect of the disclosure, a tool changer comprises a master half and a tool half. The master half is coupled with a robot. The tool half is coupled with a tool. A first mating member is on a master half and a second mating member is on the tool half. The first and second mating members include a recess or a projection, respectively, for enabling the first and second mating members to mesh with one another. A securing mechanism secures the master half and tool half with one another. The securing member includes at least one clasp moving between a release position and a grasping position. A cam plate moves the clasps between the release position and the grasping position. When the clasp is in a grasping position, the master half and the tool half are secured with one another. A lock is coupled with the cam plate. When the master half and tool half are to be secured together, the master half approaches the tool half that is coupled with the tool and retained in a storage nest. When the master half engages with the tool half for securement, the lock couples with the storage nest and after the lock is coupled, the lock is actuated and actuates the cam plate and moves the clasp(s) from its released position to its grasping position. The lock moves into a locked position thereby locking the master half and tool half together. A lock locks the tool half with the nest. The lock further comprises a stripper pin, a locating plate, a nest pin, and a sensor to detect the location of the locating plate. The locating plate receives the stripper pin and the nest pin. The nest pin is biased within the nest.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 22 is a partial perspective cross-section view of the gas/vacuum utility passage.

FIG. 23 is a partially exploded perspective view like another embodiment of FIG. 22.

DETAILED DESCRIPTION

Figure 1:
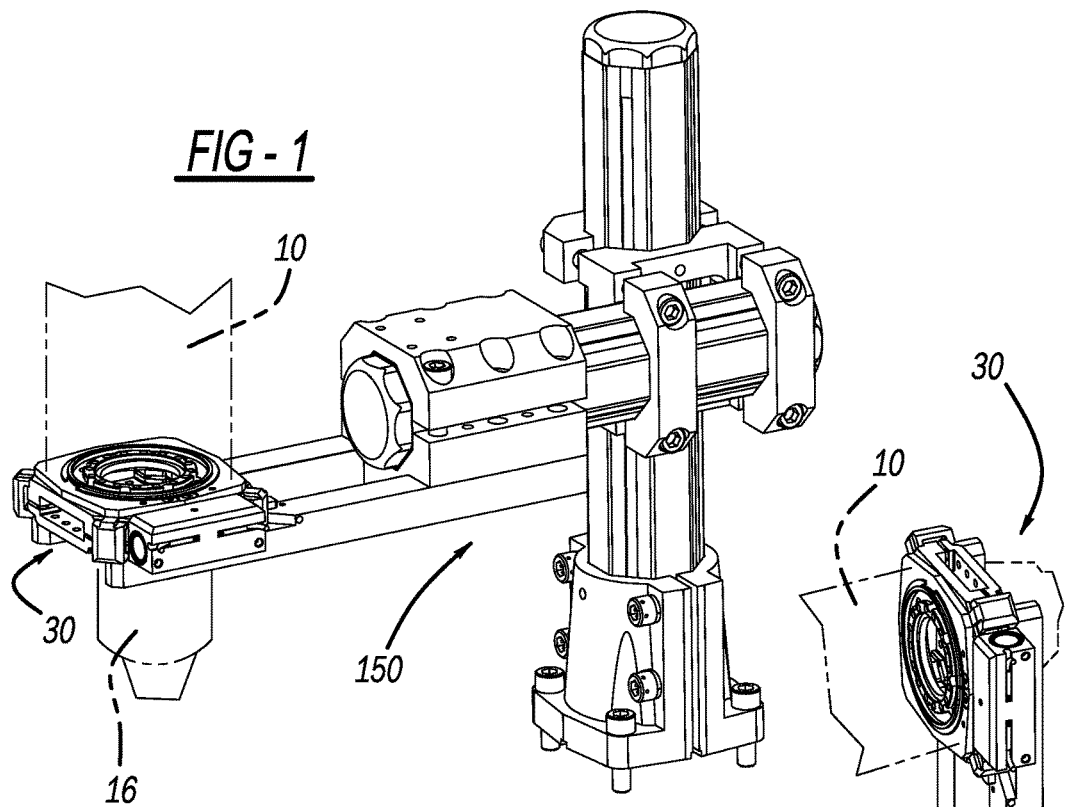
FIG. 1 is a perspective view of a nest, in a horizontal position, including the tool mount with the robot in phantom.

Turning to the figures, a tool changer 30 is illustrated on a robot arm 10 and designated with the reference numeral 30. The tool changer 30 includes a master half 32 and a tool half 34. The master half 32 is coupled with the robot 10 and the tool half 32 is coupled with a tool 16.

The master half 32 includes a body 38 and a securement assembly 40. The securement assembly 40 enables the master half 32 to be coupled and decoupled with a tool half 34.

The body 38 has an overall rectangular and almost square configuration. The body 38 is plate shaped and includes a central aperture 42 with a projecting annular boss 44. An additional annular boss 46 is positioned inside of the boss 44. The boss 46 includes a plurality of apertures 48 to enable securement of the master half 32 with the robot 10. Fasteners pass through the apertures 48 for securement.

The body 38 includes T-shaped slots 50 on its corners. The T-shaped slots 50 receive clasps 70 defined herein. The body 38 includes a channel 52 to enable passage of a pin lock 74. The channel 52 includes a front wall 54 that includes a pair of cutouts 56, 58 separated by a tooth 57. The body side opposite to the T-shaped slots 50 includes a mating member 60. The mating member 60 may include a bore or recess 62 and ball 63 to enable the mating members 60 to mesh or mate with mating members 136 on the tool half 34.

The securing mechanism 40 includes one or more clasps 70 coupled with a cam 72 activated by the lock pin 74. The clasps 70 have an overall C-shape with legs 76, 78 separated by web 80. The leg 78 is longer than the leg 76 and includes a cam pin 82. The leg 78 has an overall T-shaped in cross-section to be received in the T-slot 50. Thus, the leg 78, of the clasp 70, slides in the T-slot 50 on the body 38.

The cam 72 includes a cam plate 84 with one or more cam slots 86 receiving cam pins 82. The cam pins 82 include a cam roller 83. The slots 86 include a first portion 88 and a second portion 90. The first 88 and second 90 portions are positioned with respect to one another at a desired angle. Elastomeric members 89 are located in the second portion 90 of the slots 86. The elastomeric members 89 push the clasps 70 into their secured positions. Also, the elastomeric members 89 take up play in the mechanism to maintain a constant force on the cam pins 82 and cam roller 83 while compensating for wear and manufacturing tolerances. The cam roller 83 reduces the force required to compress the elastomeric members 89 and reduces wear in the slots 86. A retaining ring 96 is positioned on the cam plate 84. The retaining ring 96 is received in a groove 98 on the boss 44 to retain the cam plate 84 onto the master half 32.

The cam plate 84 includes apertures 100 that receives fasteners 102 that secure the lock pin 74 with the cam plate 84. The lock pin 74 is received in the channel 52. The lock pin 74 includes a housing 104, pin 106 and a spring 108. The housing 104 includes a bore 110 that receives the pin 106.

The pin 106 includes a detent 112 that prohibits the pin 106 from exiting housing 104. The spring biases the pin 106 between the cam plate 84 and housing 104. The detent 112 is received in a slot in wall 54. The detent 112 is positioned in the cutouts 56, 58 in a locked and unlocked position, as will be explained herein. The housing 104 moves within the channel 52, horizontally, with respect to the body 38. The housing 104 includes bores 118 that receives fasteners 102 that secure the lock pin 74 with the cam plate 84.

The tool half 34 includes a body 130 having an overall plate shape. The body 130 includes apertures 134 to secure the tool 16 with the tool half 34. Also, apertures 134 enable utility modules to be mounted on the tool. At least one mating member 136, four are shown, is positioned on the body 130. The mating member 136 includes a recess 138 to receive the ball 63 from the master half mating member 60. Thus, there are recesses 62, 138 on both the master 32 and tool halves 34.

An elongated slot 140 is formed in the body 130. The slot 140 receives the pin housing 104 enabling the housing 104 to move horizontally with respect to the body 130. The opposite side of the body 130 includes one or more posts 142. The posts 142 include a head 144 and a neck 146. The neck 146 secures with the body 130. The posts 142 secure with the nest 150. Additionally, the body 130 includes shoulders 148 at its corners to receive the clasps 70 as will be explained herein.

The nest 150 is U-shaped with legs 152, 154 separated by a web. The legs 152, 154 include one or more channels 158. The channels 158 include an opening 160 to receive the head 144 of the posts 142. The channels 158 also include an elongated slot 162 coupled with the opening 160. The slot 162 receives the neck 146 of the post 142. Thus, the posts 142 are positioned within the channels 158 through opening 160. The post 142 is slid in the elongated slot 162 so that the head 144 is in the channel 158 to retain the tool half 34 on the nest 150. The leg 152 includes a bore 164. The bore 164 receives the pin 106 of the lock 74.

Figure 2:
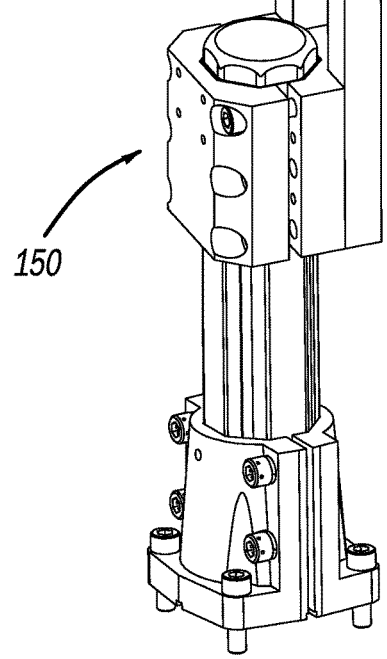
FIG. 2 is a perspective view of the nest in a vertical position.
Figure 3:
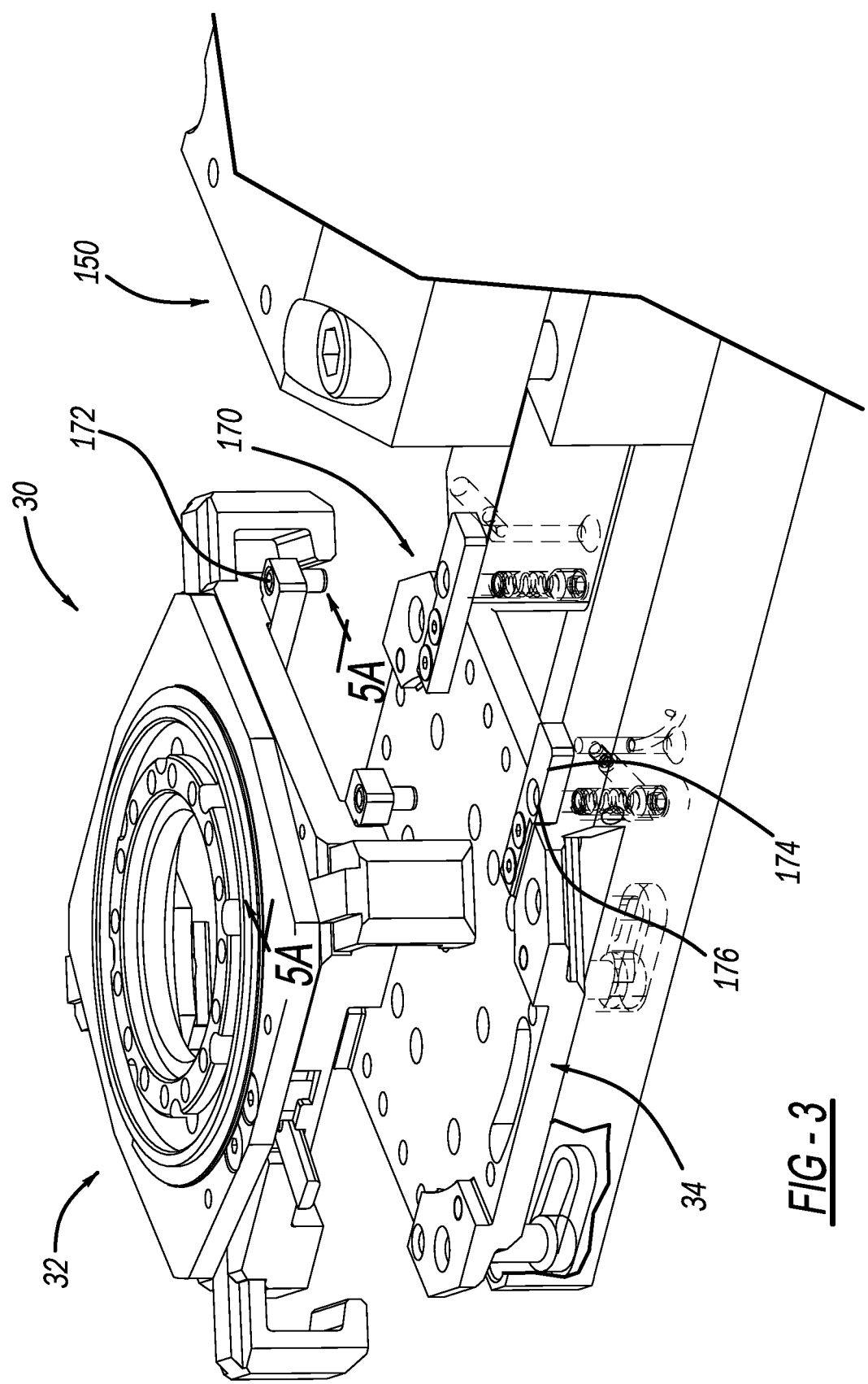
FIG. 3 is a perspective view of the tool changer separated in the nest.
Figure 4:
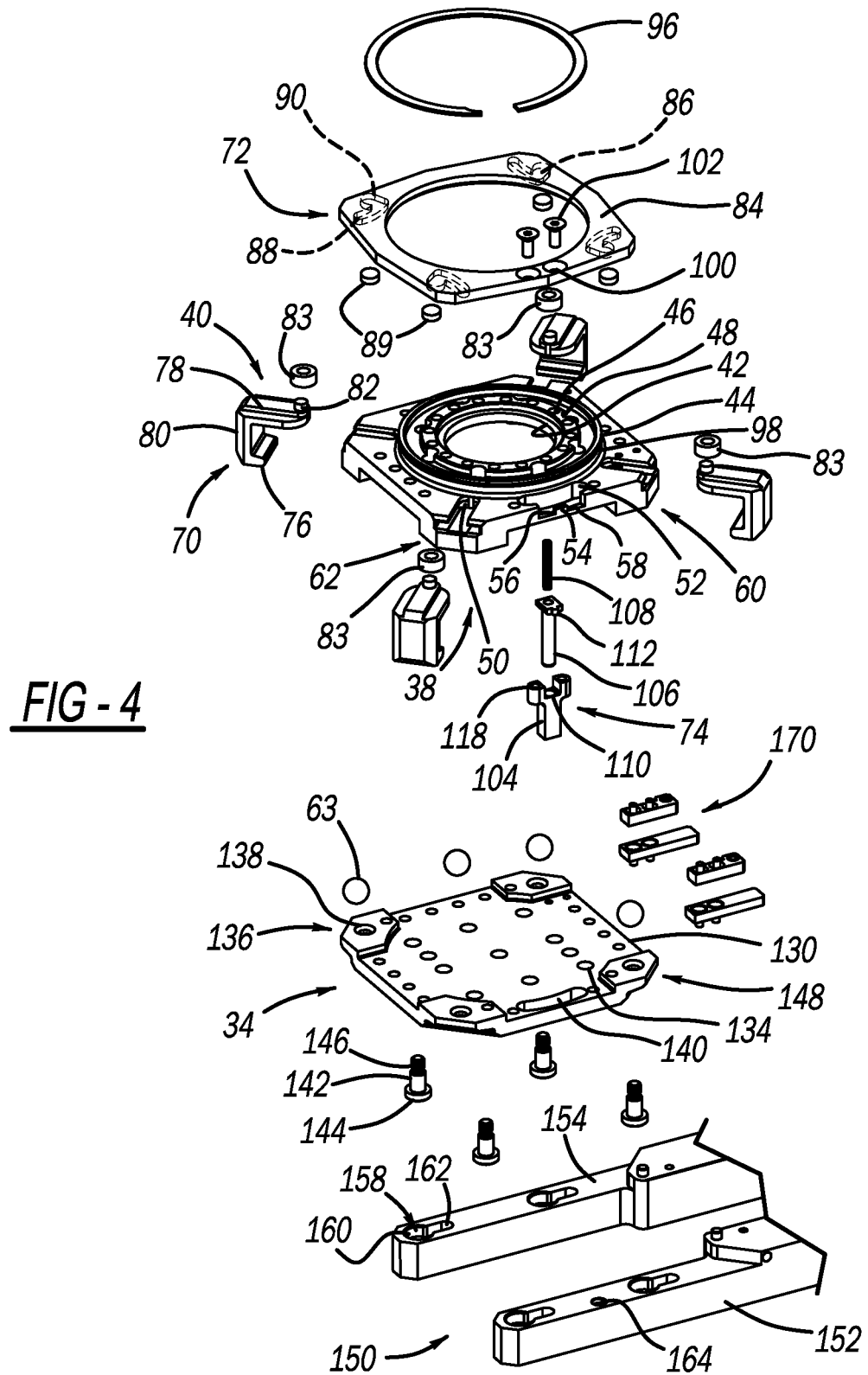
FIG. 4 is an exploded perspective view of the tool changer.

Turning to FIGS. 1-3, the tool changer 30 is illustrated on the nest 150 in both a horizontal and vertical position. Thus, the tool changer and tool can be horizontal or vertical such that lateral and axial movements initiate the coupling and decoupling of the tool changer.

FIGS. 3, 5A, 5B and 5C illustrate a modular tool lock assembly 170 locking the tool changer 30 with the nest 150. The tool lock assembly includes stripper pins 172 positioned onto the master half 32. Additionally, locating plates 174 are positioned onto the tool half 34. The locating plates 174 include an aperture 176 to receive the stripper pins 172. Spring loaded nest pins 178 are positioned within the nest legs 152, 154. Additionally, sensors 180 are positioned adjacent to the nest pin 178 to sense the position of the locating plates 174 on the nest 150. Thus, information is relayed to the robot 10 for the positioning of the tool changer 30 in the nest 150.

Figure 5A:
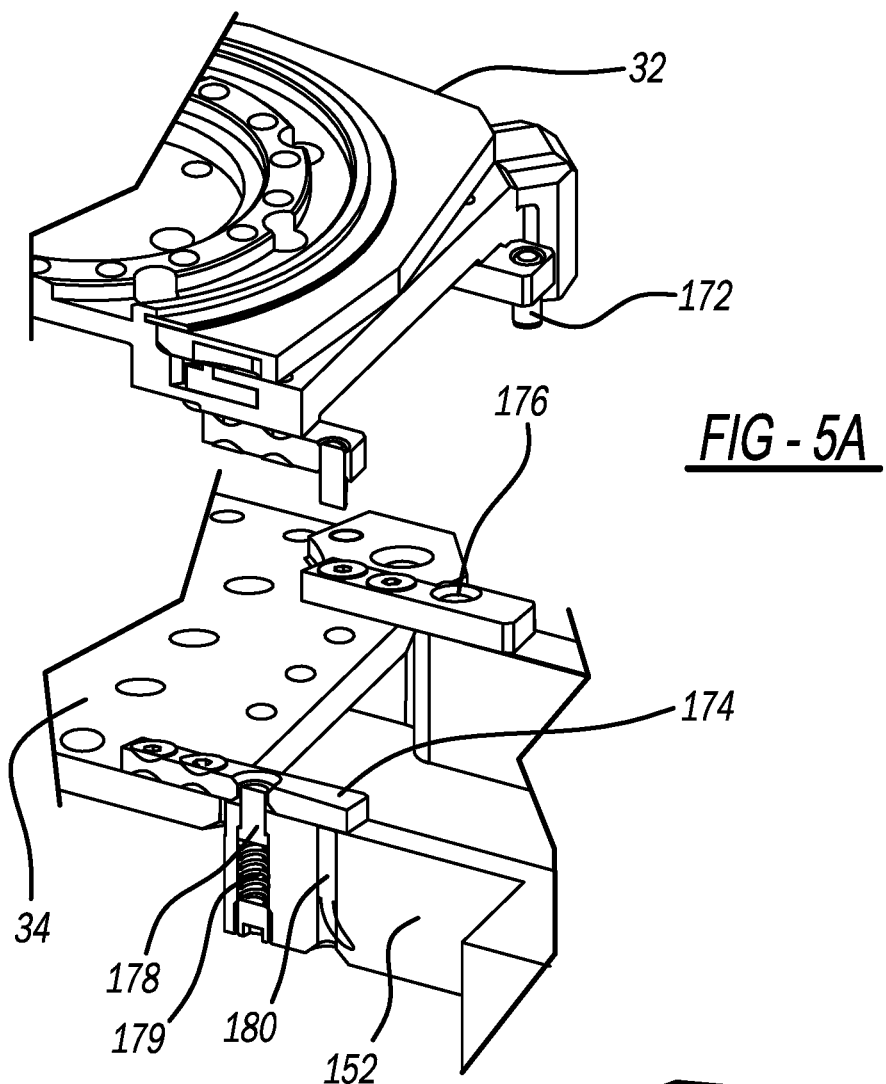
FIG. 5A is a cross-section view of FIG. 3 along line 5A-5A.
Figure 5B:
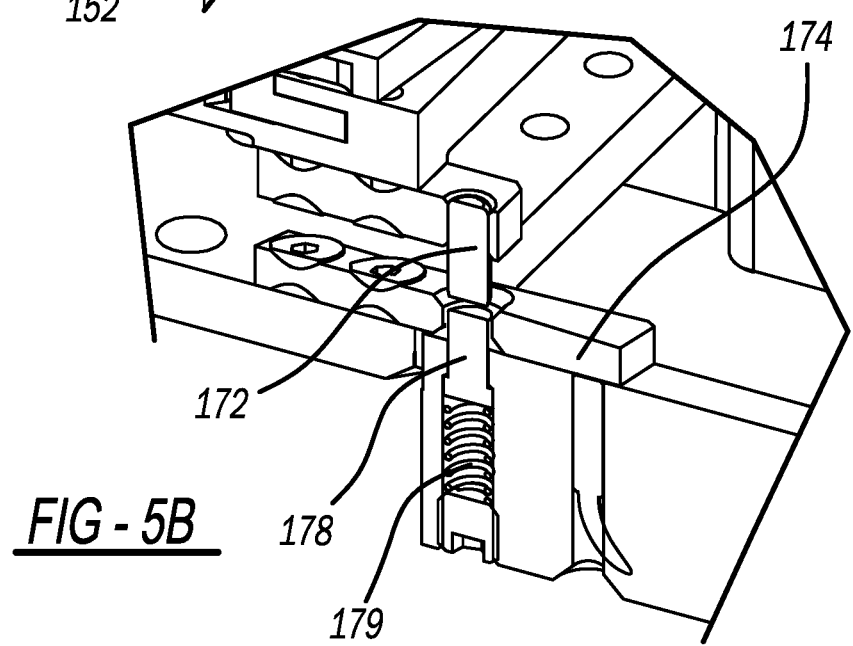
FIG. 5B is a cross-section view like that of FIG. 5A with the master half beginning coupling with the tool half.
Figure 5C:
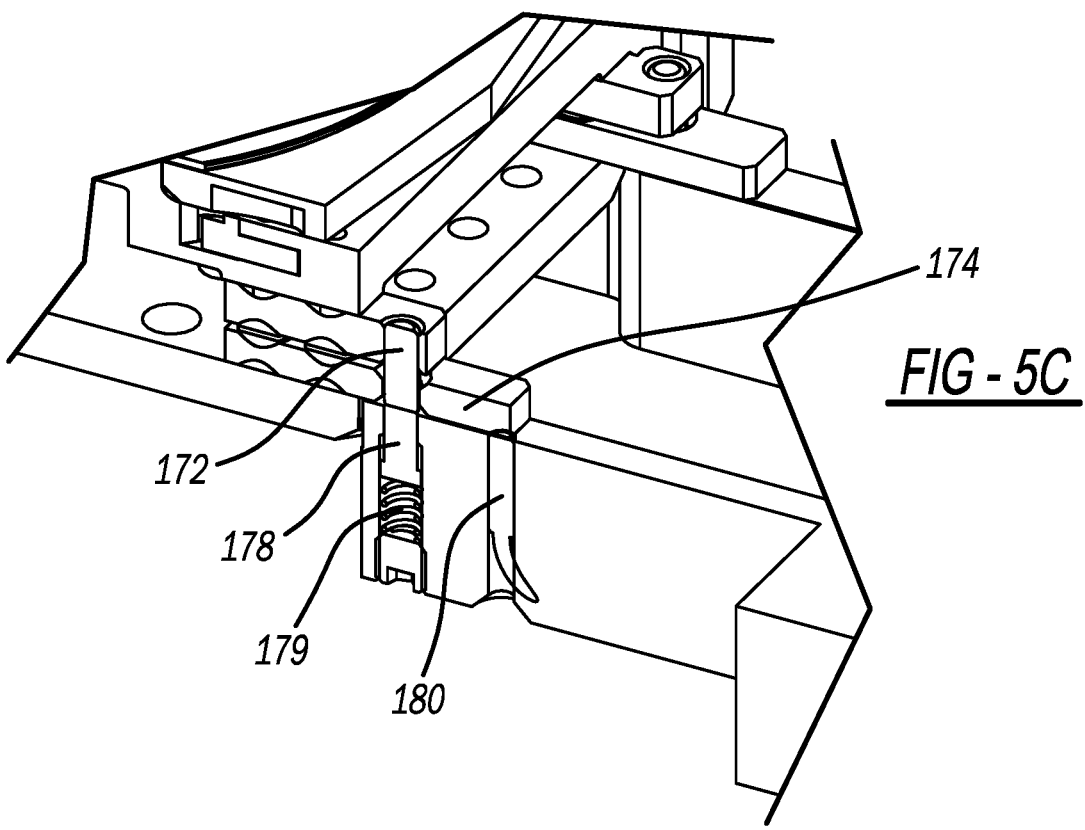
FIG. 5C is a cross-section view like FIG. 5B with the master half coupled with the tool half.

Turning to FIGS. 5A-5C, the locking of the stripper pins 172 with the locating plates 174 is illustrated. Here, the spring loaded nest pin 178 is in the apertures 176 to provide positioning with respect to the sensors 180. Also, the nest pins 178 in combination with the posts 142, function to lock the tool half 34 in the nest. As the stripper pins 172 enter the apertures 176, the springs 179 are compressed and the nest pins 178 are pushed into the legs 152, 154. Once the nest pins 178 are flush with the surfaces of the legs 152, 154, the stripper pins 172 are in the apertures 176 and the master half 32 is in position for coupling with the tool half 34. Also, at this time, the tool half 34 and master half 32 are able to move laterally with respect to the nest legs 152, 154 to enable the tool Changer 30 to slide in the nest 150 and be released from the nesting legs 152, 154 as will be explained herein.

Coupling and decoupling of the master half 32 and tool half 34 occurs as follows.

Figure 9:
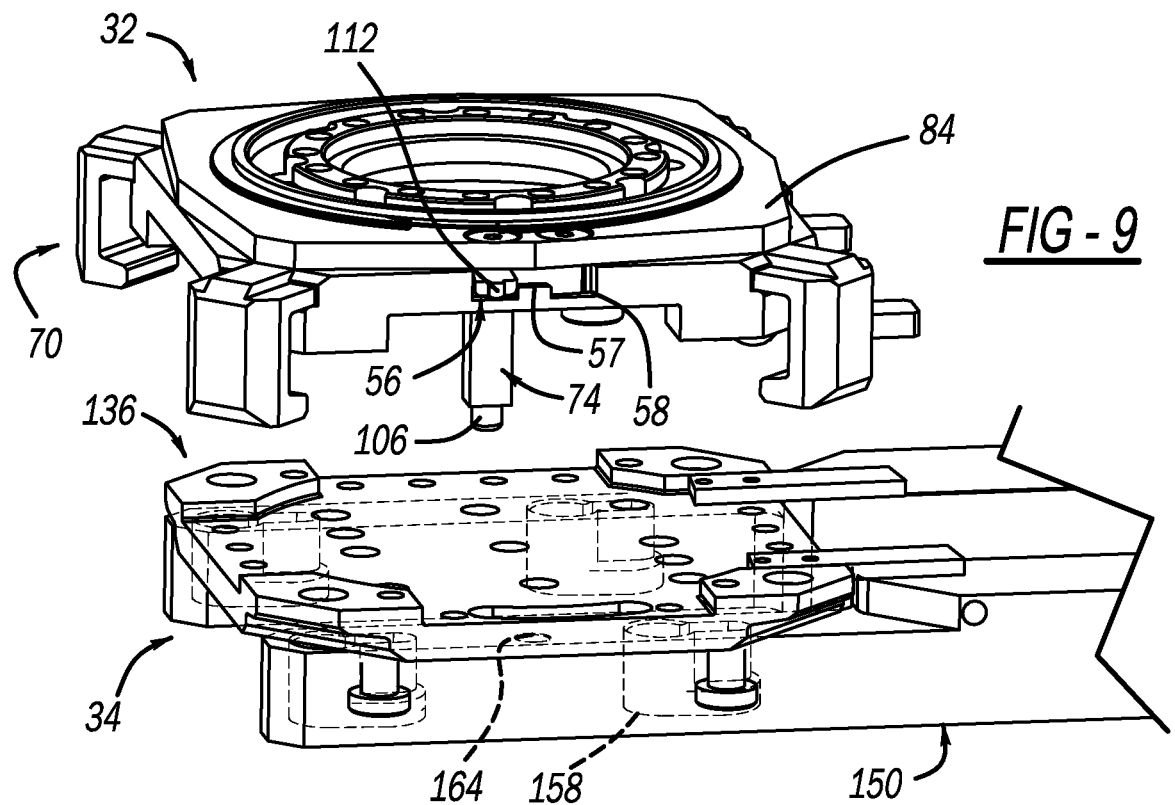
FIG. 9 is a perspective view of the halves decoupled.

Turning to FIG. 9, the master half 32 is positioned away from the tool half 34. This is the uncoupled position. Here, the clasps 70 are positioned in a release position away from the body 38. The pin detent 112 is received in cutout 56. Thus, the clasps 70 are locked in the release position.

Figure 10:
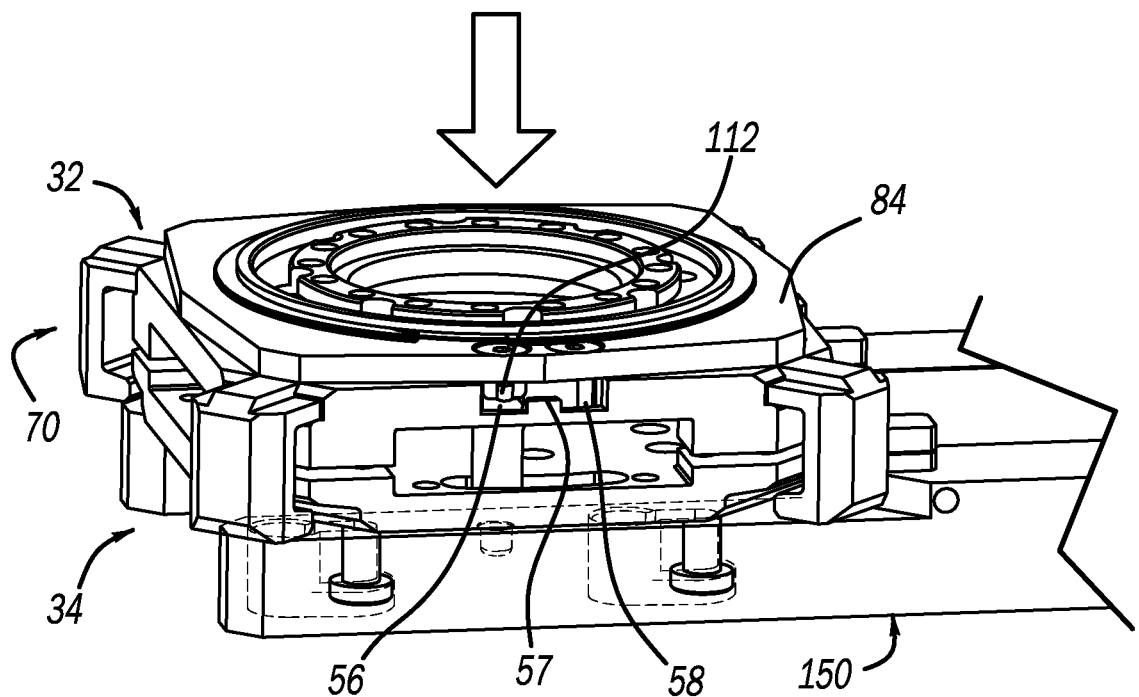
FIG. 10 is a perspective view of the two halves beginning the coupling process.

Turning to FIG. 10, the robot 10 moves the master half 32 into contact with the tool half 34. The tool half 34 is seated in the nest 150. As the halves 32, 34 come together, the pin 106 contacts the bottom of the bore 164. This pushes the pin 106 against the spring 108 removing pin detent 112 out of the cutout 56. The tool half 34 is retained on the nest 150 in the channels 158. The posts 142 are positioned in the channels 158 such that the heads 144 cannot be removed from the opening 160.

Figure 11:
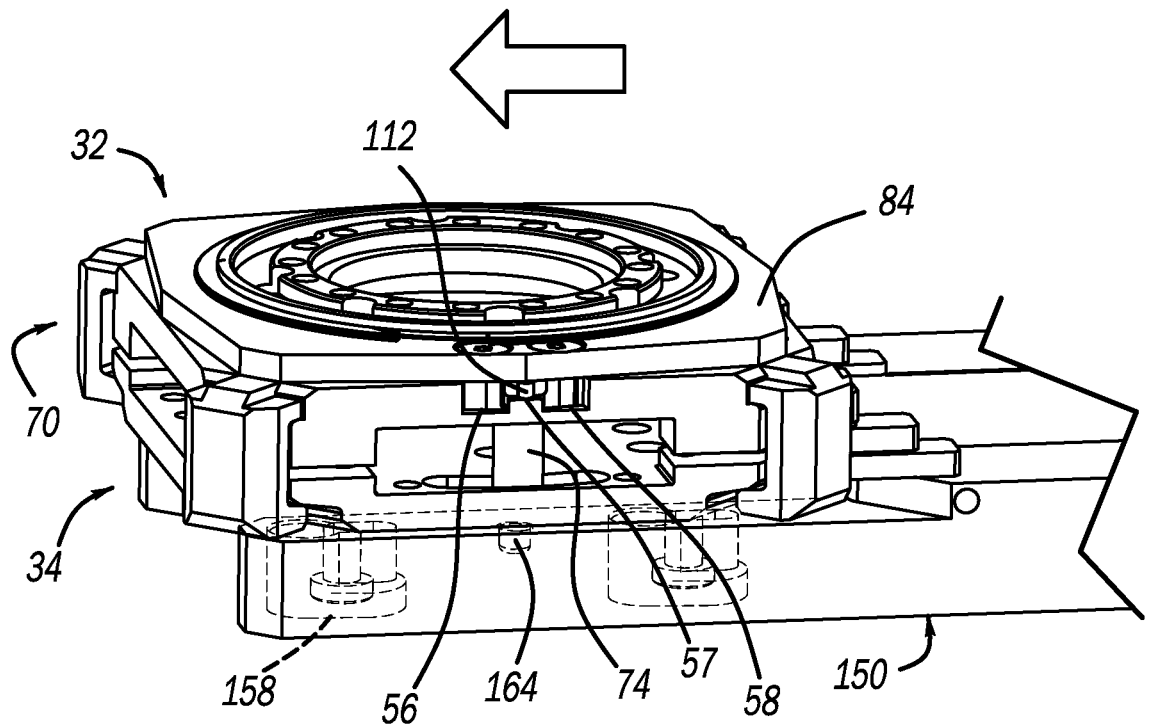
FIG. 11 is a perspective view like FIG. 8 continuing the coupling process.

FIG. 11 illustrates the robot 10 moving the master half 32 laterally with the tool half 34. As this occurs, the pin 106 contacts walls of the bore 164. This enables the lock 74, secured with the cam plate 84, to actuate the cam plate 84. As this occurs, the pins 82 and rollers 83 slide in the slots 86. As the cam plate 84 moves the pins 82 and rollers 83 in the slots 86, the clasps 70 move into a grasping position. Here, the leg 76 is received in the shoulder 148 securing or locking the master half 32 with the tool half 34.

Figure 12:
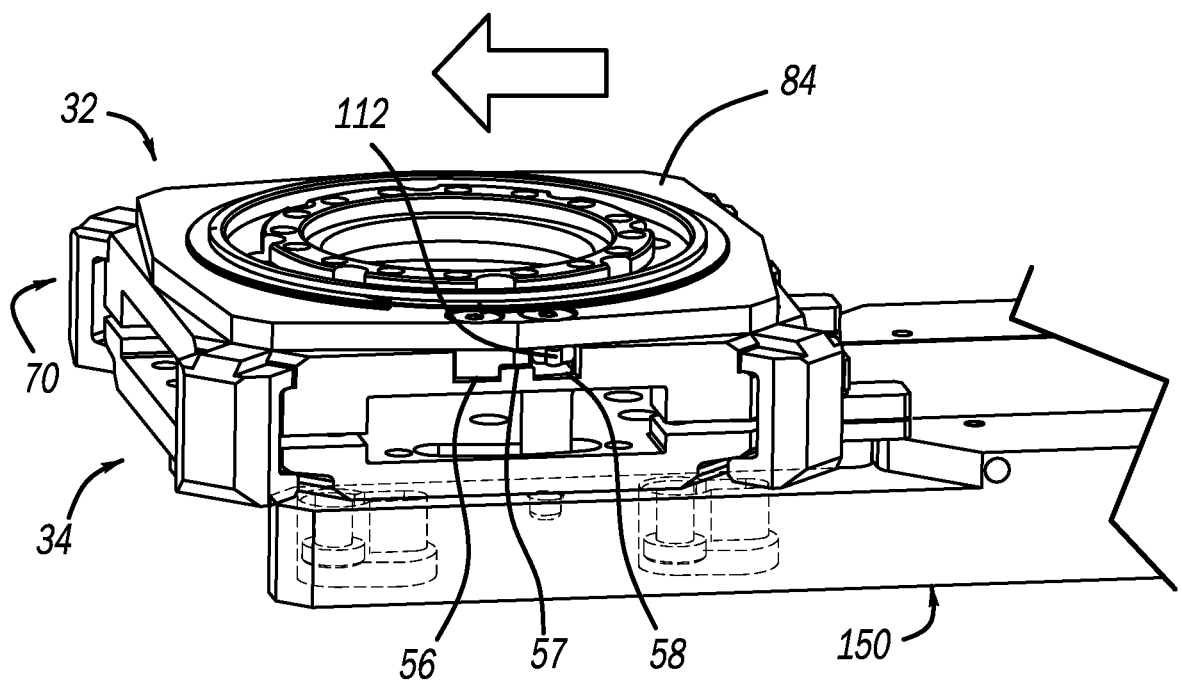
FIG. 12 is a perspective view like FIG. 11 illustrating the coupling process.
Figure 13A:
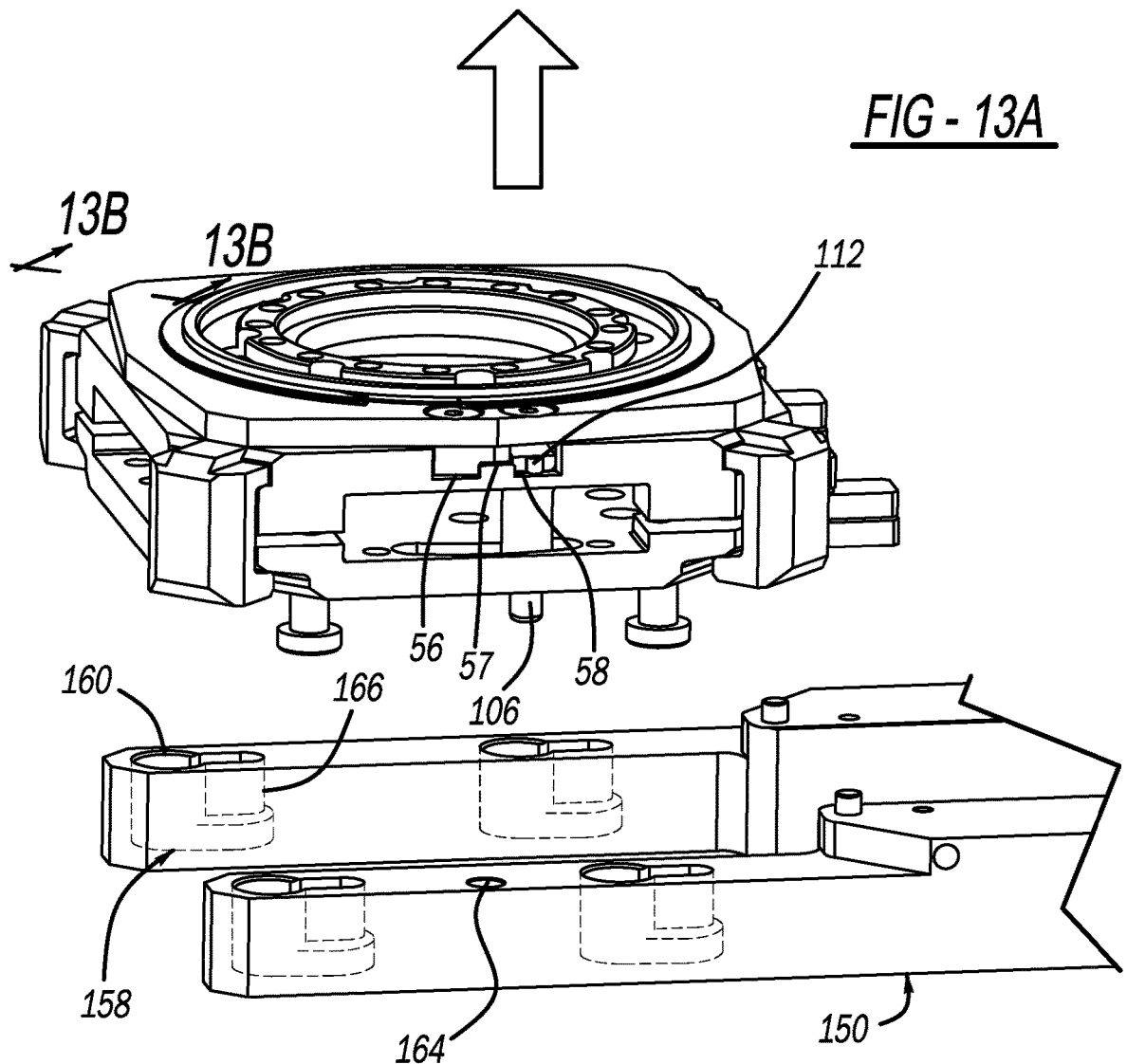
FIG. 13A is a perspective view with the tool halves coupled together.
Figure 13B:
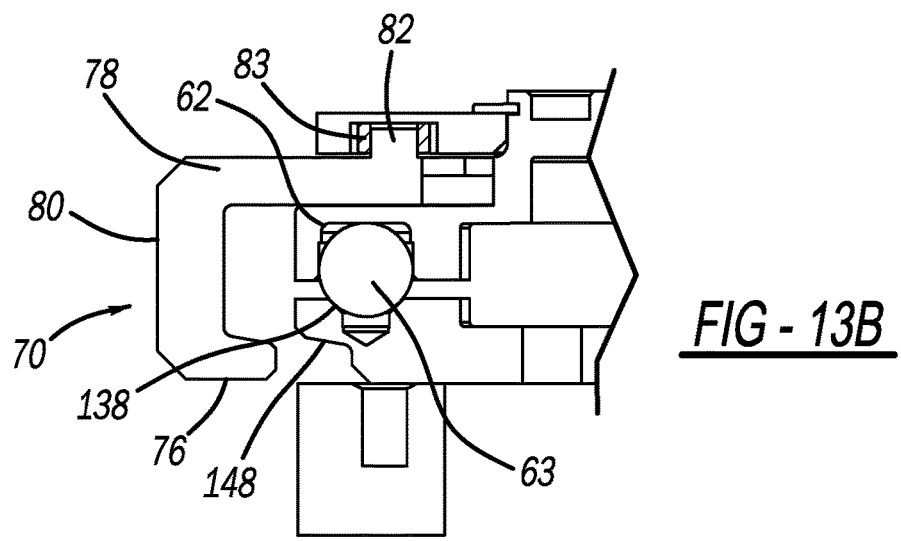
FIG. 13B is a cross-section view through line 13B-13B of FIG. 13A.

FIG. 12 illustrates the robot 10 continuing to move laterally to finish the movement of the cam plate 84. In turn, the clasps 70 move into their secured locking position. Additionally, the pin detent 112 moves to a position above the cutout 58. As the robot 10 moves axially away from the nest 150, as illustrated in FIG. 13, the pin 106 is moved away from the master half 32 by the spring 108. This moves the lock 74 into a locked condition with detent 112 engaged into slot 58 so that the master half 32 and tool half 34 are locked together.

To decouple the master half 32 and tool half 34, the robot 10 positions the tool changer in the nest 150. The robot 10 moves laterally in the opposite direction to open/move the clasps to their released position. This enables the master half 32 to uncouple from the tool half 34. Thus, the robot 10 could be utilized to pick up an additional tool to do an additional function. The additional tool would have a tool half 34 as described above. Also, the nest could move or both the nest and robot could move the tool halves 32, 34.

In the event, during operation, the tool changer would need the master half 32 separated from the tool half 34 manually, this could be done by a worker. The worker would push the pin 106 to move the detent 112 out of the cutout 58. This would enable the housing 104 to be moved by a screwdriver or the like to its released position releasing the clasps 70 from the tool half 34. Thus, upon release, the pin detent 112 would move into the cutout 56 and the master half 32 would be in a locked decoupled position.

Figure 6:
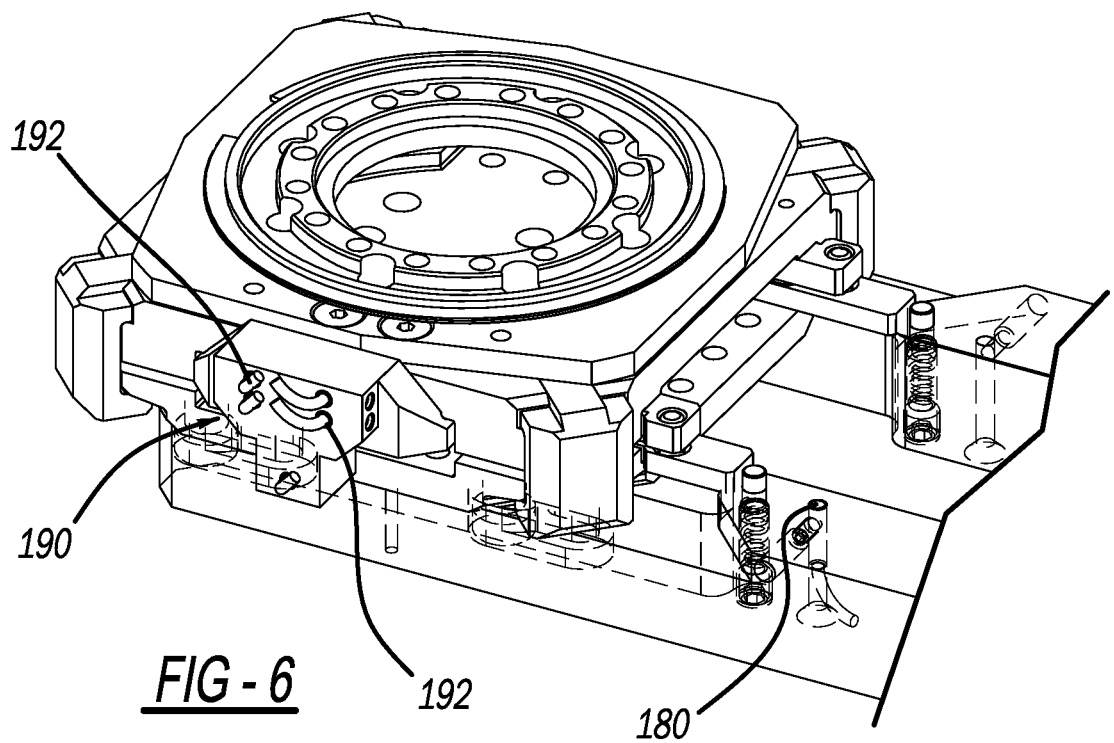
FIG. 6 is a perspective view of the tool changer with a sensor lock.
Figure 7:
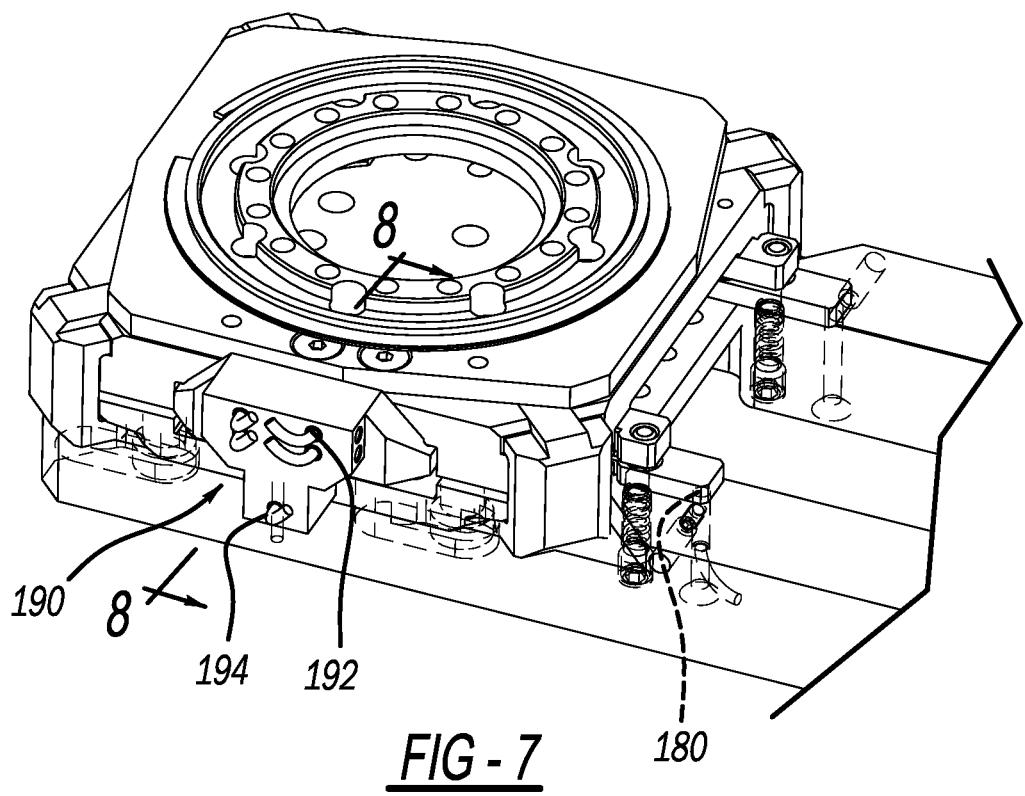
FIG. 7 is a perspective view like FIG. 6 in a second position.
Figure 8:
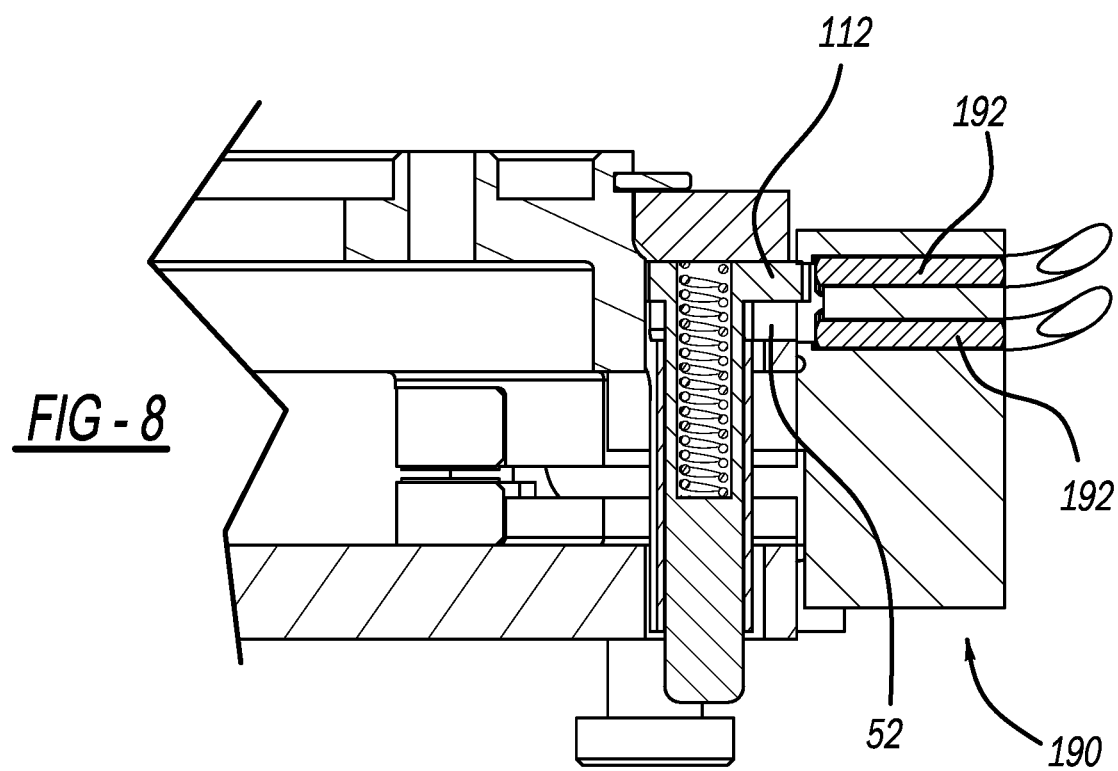
FIG. 8 is a cross-section view through line 8-8 of FIG. 7.

FIGS. 6-8 illustrate another embodiment of the design. A lock sensor 190 is coupled with the master half 32. The lock sensor 190 includes a plurality of sensors 192, 194, five are shown. The sensors sense the position of the lock detent 112 in the channel 52 and in the cutout 56, 58 as well as above the tooth 57. This provides information to the robot to indicate the locking and/or unlocking of the master half 32 and tool half 34 as explained above. Also, the sensor 194 senses that the tool half 34 is in position with respect to the master half 32. As illustrated in FIGS. 7 and 8, the sensors 180 also provide feedback for position of the tool changer 30 on the nest 150.

Thus, the four sensors 192 determine the position of the detent 112 to determine if it is in or out of slots 56, 58 as well as above the tooth 57 which corresponds to the above explanation of coupling and decoupling of the tool changer 30.

Figure 14:
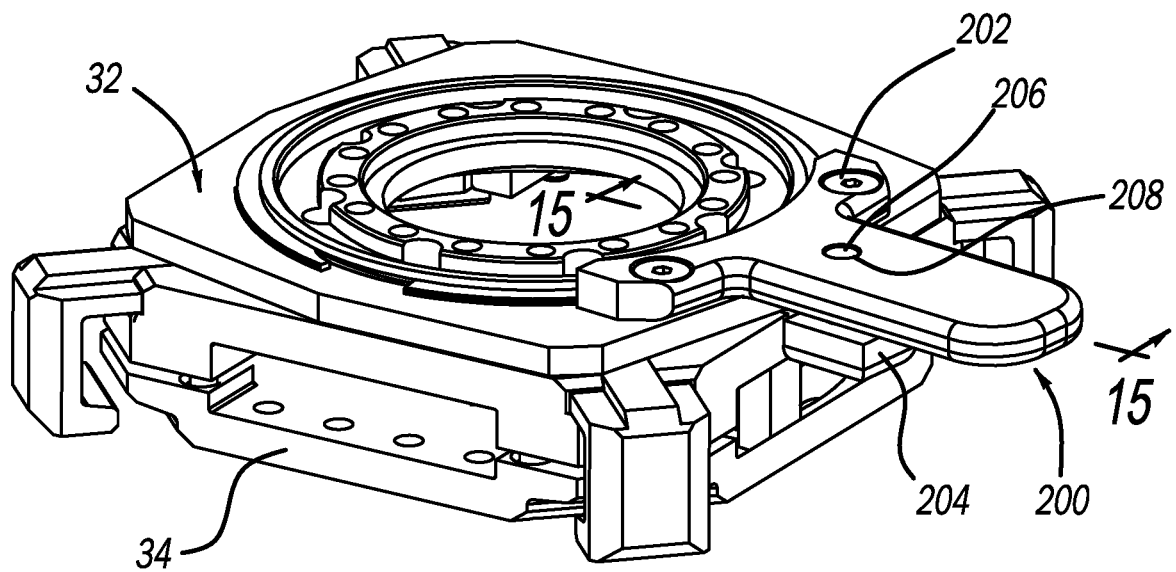
FIG. 14 is a perspective view of the tool changer with a manual lock.
Figure 15:
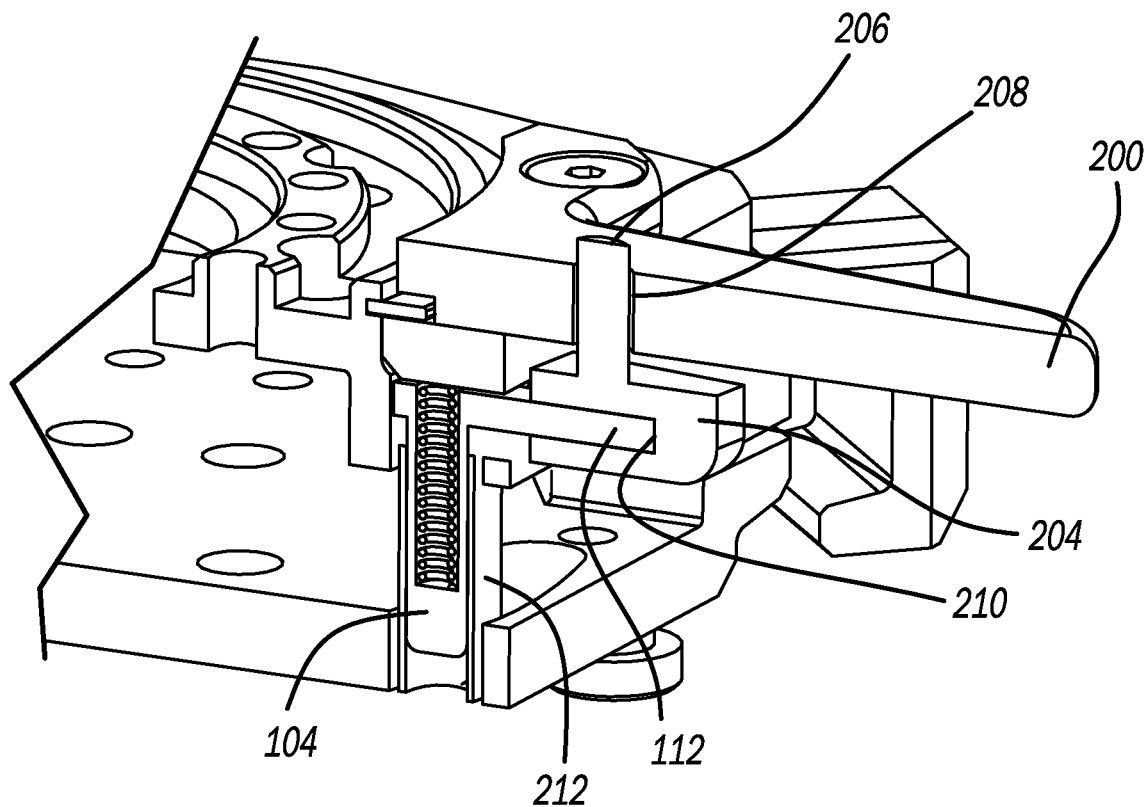
FIG. 15 is a section view through line 15-15 of FIG. 14.
Figure 16:
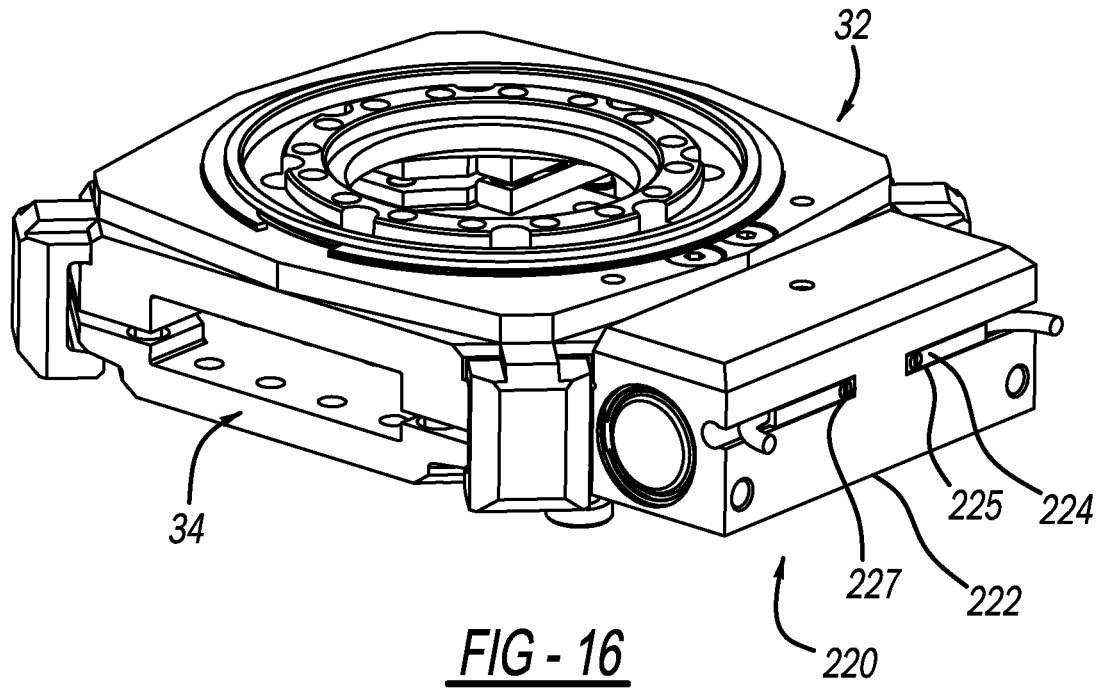
FIG. 16 is a perspective view of the tool changer with a fluid-actuated lock.
Figure 17:
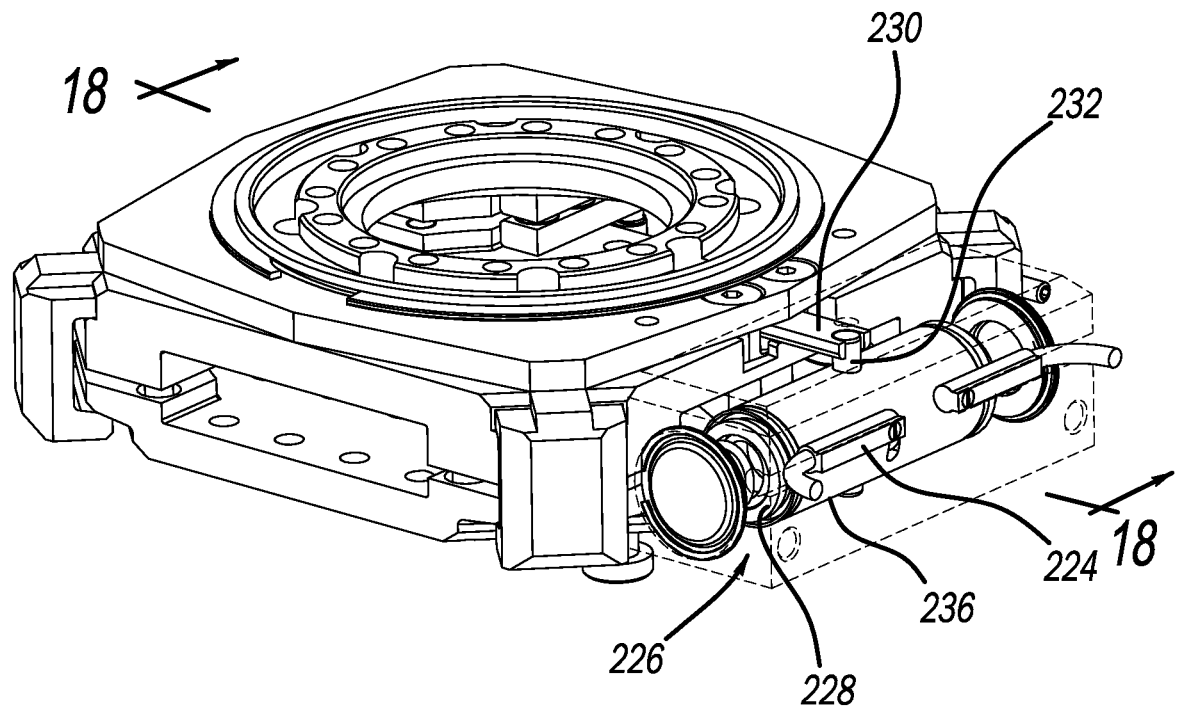
FIG. 17 is a perspective partially in phantom of FIG. 16.
Figure 18:
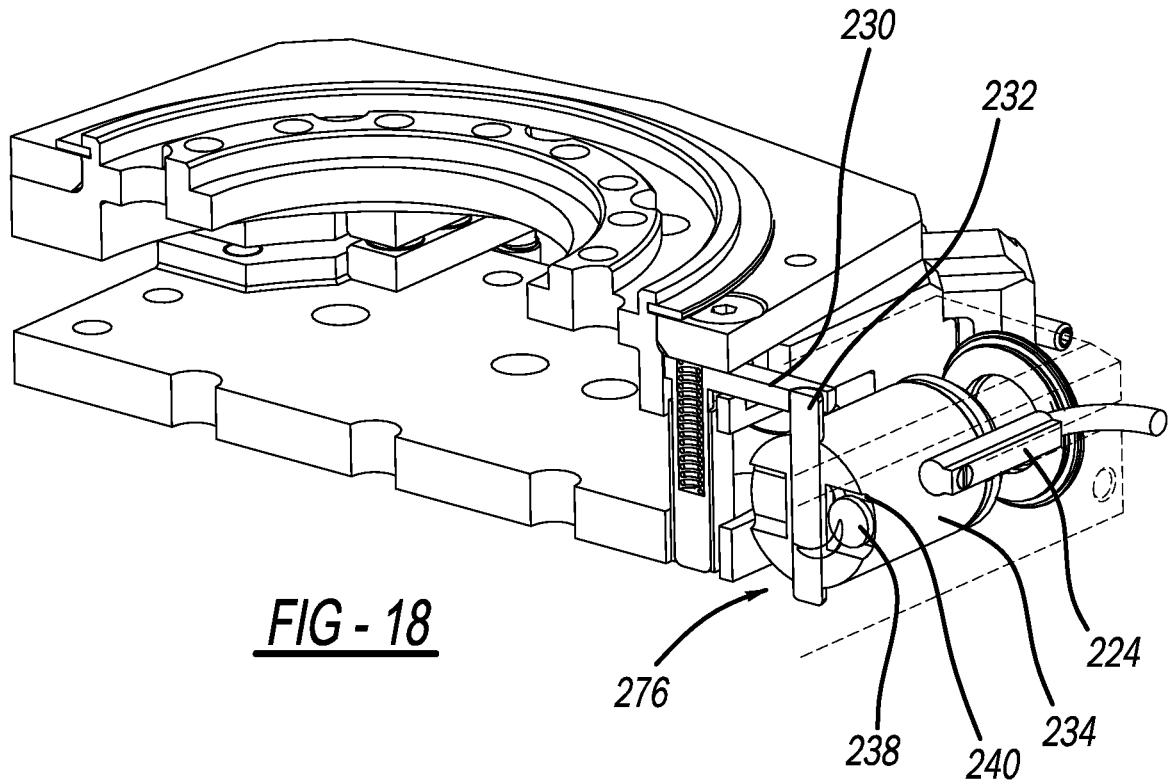
FIG. 18 is a cross-section view along line 18-18 of FIG. 17.

Turning to FIGS. 14 and 15, a manual locking design is shown. Here, in the manual design, the locking and unlocking of the master half 32 with the tool half 34 can occur outside of the nest or if desired on the nest.

A handle 200 is secured with the cam plate 84 via fasteners 202. A lock release button 204 is coupled with the handle 200 via a movable pin 206. The movable pin 206 moves up and down in a bore 208 in the handle 200 to indicate when the lock 74 is not in a locked position in the slots 56, 58 as explained above. The movable pin 206 is colored red on its circumference to indicate the unit is unlocked when the pin 206 stands proud of the handle 200. The release button 204 includes a slot 210 to receive an extended detent 112. The lock 74 is like that previously described, however, it is received into a tube 212. The tube 212 does not enable the housing 104 to project beyond the tool half 34. Also, the pin 106 is not present in this design.

The manual handle 200 is actuated as described above via the button 204. When the release button 204 is pressed towards the handle 200, the detent 112 is removed from the slot 56, 58 enabling the handle 200 to be moved laterally to move the cam plate 84 between the locking and unlocking positions.

Turning to FIGS. 16-19, an additional embodiment of the tool changer is illustrated. Here, an automated lock actuator 220 may be utilized to move the arm 230 between its locked and unlocked positions.

The automated lock actuator 220 includes a housing 222 with sensors 224. The housing includes a piston assembly 226 that is fluidly actuated in the housing 222. Preferably pneumatically. Additionally, a spring 228 is positioned in the housing 222. The spring maintains the piston 234 in a grasping position of the master half with the tool half in the event of a power failure or hose failure.

The cam plate 84 includes a drive arm 230 attached to the cam plate 84. The drive arm 230 includes a slot receiving a drive pin 232 on the piston 234. The piston 234 is moved in the bore 236 which enables the drive pin 232 to move the drive arm 230 from a locking/unlocked/grasping to release position as explained above. Here, the drive arm 230 does not include the lock features 74 as described above. The piston 234 includes a magnet 238 positioned in a slot 240 enabling the magnet 238 to be sensed by the sensors 224. The sensor 224 mounts in slot 225. The slot 225 has an end 227 that acts as a stop to correctly position the sensors.

In operation, as the piston 234 is moved in the bore 236, the sensors 224 sense the position of the magnet 238. As the piston 234 drives the arm 230, the cam plate 84 is rotated, moving the clasps 70 between the grasp and release position as explained above. Should the power or fluid pressure be lost, the spring maintains the piston 234 to retain the master half 32 and tool half 34 in a grasped position.

Figure 19:
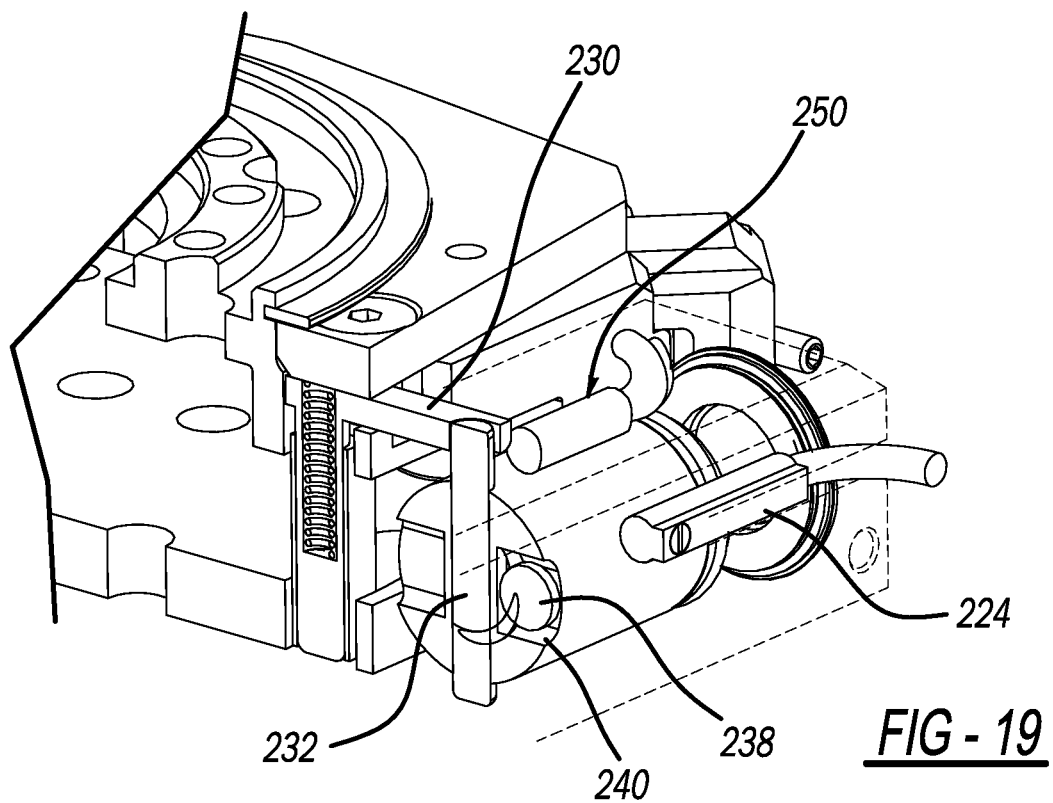
FIG. 19 is a perspective view like FIG. 17.

Turning to FIG. 19, sensor 250 is shown sensing the position of the drive arm 230. Thus, the sensor 250 senses the position of the pneumatic piston assembly 226 with the locking arm 230 in a locked position.

Figure 20:
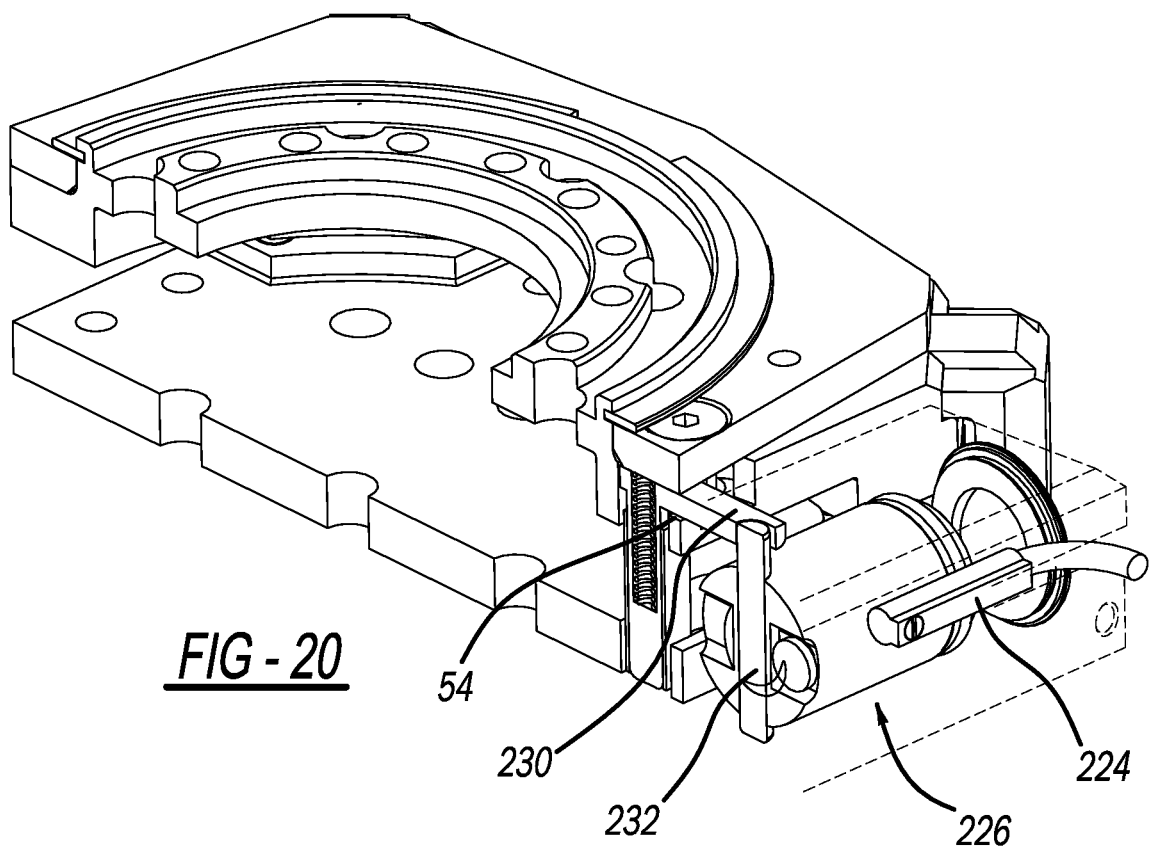
FIG. 20 is a cross-section view of another embodiment of the actuator.
Figure 21:
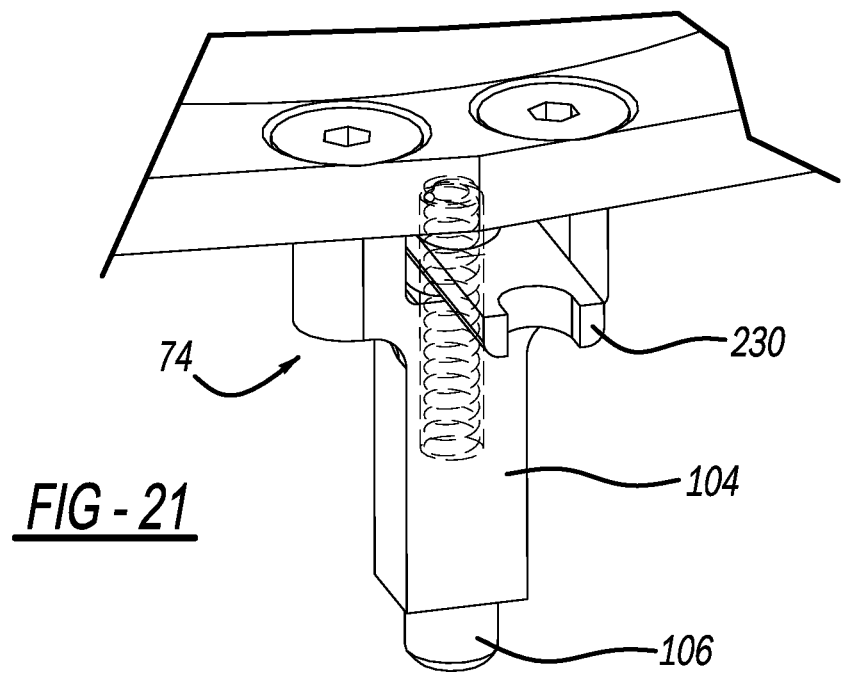
FIG. 21 is a perspective view of the lock of FIG. 20.

FIGS. 20 and 21 illustrate another embodiment. This embodiment is like the previous embodiment except for the addition of a lock 74 coupled with the piston assembly 226. Thus, the piston assembly 226 would not be able to be activated without the drive arm 220 first being moved from the slots 56, 58 as explained above. Thus, the pin 106 can be actuated manually or by the nest to release the drive arm 230 from the slots 56, 58. Once the drive arm 230 is released from the slots 56, 58, the piston can be actuated as explained above. Additionally, an sensor 250 can be positioned as indicated above. Here, the sensor 250 senses that the piston is in the proper position and also that the lock pin detent 112 has entered cutout 58. The lock pin is a failsafe such that if an operation error occurs the piston will not move due to the detent being in the locked position. The detent must be pushed out of the cutout 58 for operation to continue.

Turning to FIGS. 22-25, sealing solutions for the master half 32 and tool half 34 are illustrated. The master half bore 262 is aligned with the tool half bore 264. Coaxial channels 266, 268 are formed in both the master half 32 and tool half 34 about the bores 262, 264. Seals are 270 is positioned within the annular channels 266, 268. The seals 270 can be O-rings with a circular cross-section, a quad cross-section or a rectangular cross-section. A snap in or retention mechanism 272 is within the channels 266, 268. The retention mechanism 272 may be a projection 273 for retaining the seals within the channel.

Thus, the elastomeric ring seals 270 are located outside the flow path of the air passing through the bores of the tool changer 30. This makes the seals 270 invulnerable to blow out should the tool changer 30 decouple with air pressure applied. The seal to seal interface is present when the master half 32 and tool half 34 are combined together. Also the retention feature 272 retains the seal 270 in the channel 266, 268 without the use of adhesives making it easy to replace should it become worn.

FIG. 23 illustrates a modular version wherein the manifolds 280 are secured with the master half 32 and tool half 34.

Figure 24:
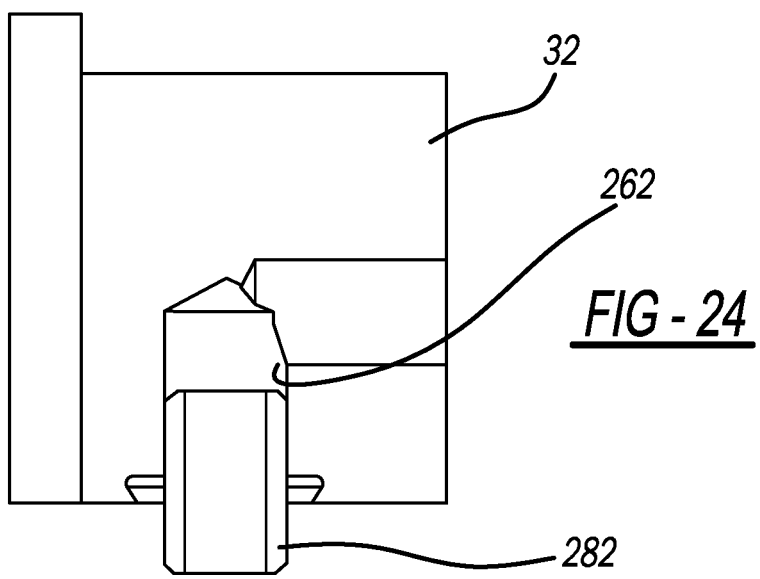
FIG. 24 is a cross-section view of another embodiment of the connection between the master and the tool halves of gas/vacuum utility passage.
Figure 25:
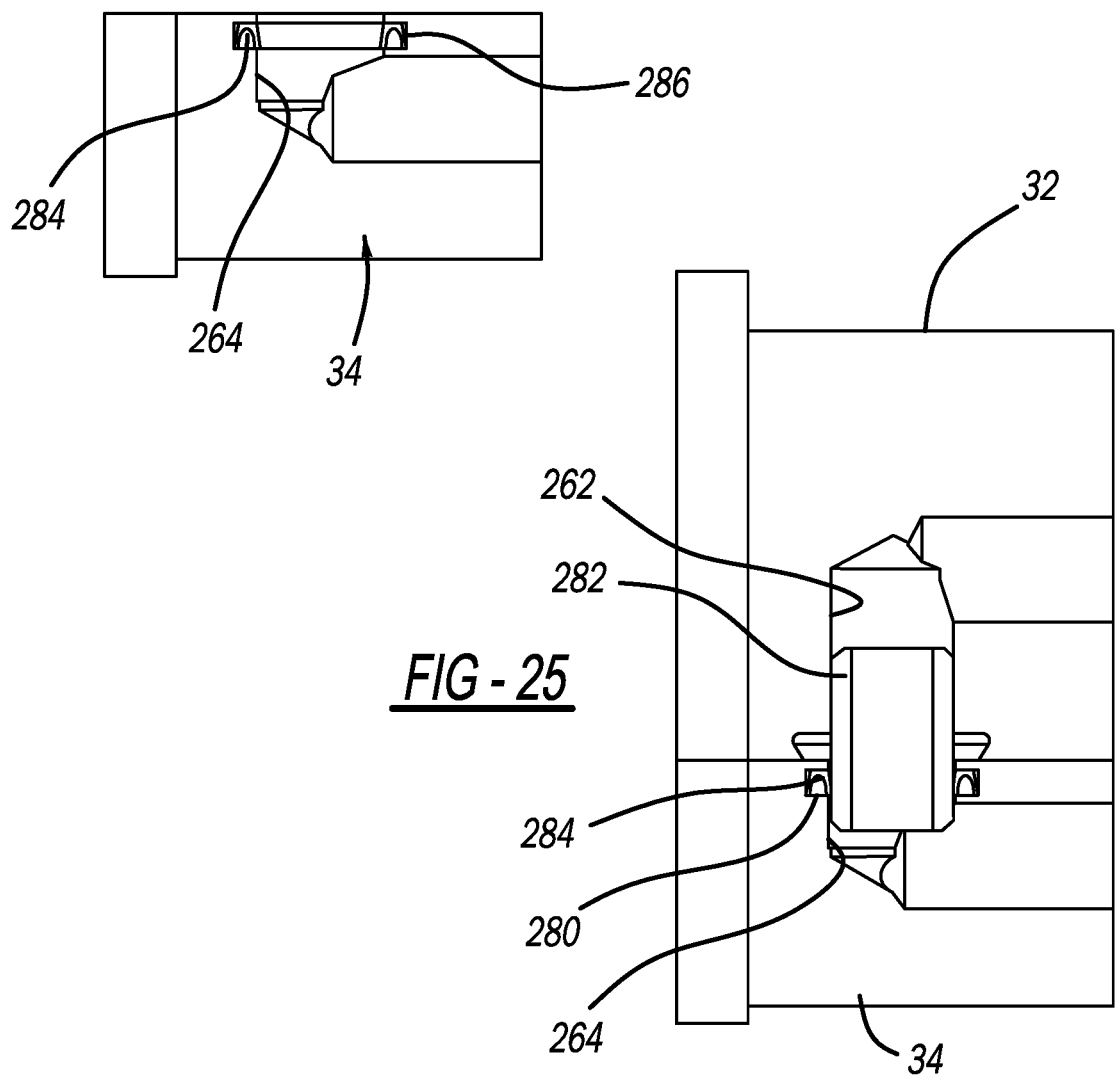
FIG. 25 is a view like FIG. 24 with the halves connected.

Turning to FIGS. 24 and 25, a tube 282 is illustrated in the robot bore 262. Also, a seal 284 is positioned in an annular channel 286 associated with the master half bore 264. Here, the cup seal 284 is positioned within the channel 286, however, it is retained outside of the airflow of the bore 264. Should the robot master half be separated slightly under load, the seal will not be broken between the tube 282 and the seal 284 and thus pressure will not be lost between the two.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tool changer comprising:
a master half and a tool half, the master half to be coupled with a robot, the tool half to be coupled with a tool;
a first mating member on the master half;
a second mating member on the tool half, the first and second mating members including a recess or a projection, respectively, for enabling the first and second mating members to mesh with one another;
a mechanism for securing the master and tool halves with one another, the securing mechanism including a clasp moving between a release position and a grasping position, and a cam plate for moving the clasp between the release position and the grasping position, wherein when the clasp is in the grasping position, the master half and the tool half are secured together with one another;
a lock coupled with the cam plate, and
when the master half and the tool half are to be secured together, the master half approaches the tool half, the master half engages with the tool half for securement, the lock is actuated and pivots the cam plate and moves the clasp from its release position to its grasping position, wherein
the lock moves into a locked position thereby locking the master half and the tool half together.

2. The tool changer of claim 1, wherein the lock is manually actuated and further comprises a handle coupled with the cam plate.

3. The tool changer of claim 2, wherein a lock release is coupled with the handle for actuating the lock and provides an indicator identifying that the lock is not in a fully locked position.

4. The tool changer of claim 1, wherein the lock is automated and further comprises a fluid operated piston assembly coupled with the lock.

5. The tool changer of claim 4, wherein the piston assembly includes a movable piston coupled with an arm of the lock.

6. The tool changer of claim 5, further including at least one sensor, positioned in a housing slot, sensing the position of the movable piston.

7. The tool changer of claim 4, wherein the piston assembly including a piston coupled with an arm detent coupled with the lock pin movable in the lock housing, the arm detent position in a cutout so that the lock pin must be activated to move the arm detent out of the slot in order to move the lock between release and grasping positions.

8. The tool changer of claim 7, further comprising a spring acting on the piston to retain the tool changer in the grasping position in the event of a power or fluid supply failure.

9. The tool changer of claim 1, wherein each clasp includes a jaw and a cam pin and each cam pin includes a rolling cam follower to reduce force required to compress an elastomeric spring and to reduce war on the cam slot and cam follower.

10. The tool changer of claim 1, further comprising a tool lock for locking the tool half with the nest.

11. The tool changer of claim 10, wherein the tool lock further comprising a stripping pin, locating plate, a nest pin and a sensor detecting the locating plate.

12. The tool changer of claim 11, wherein the locating plate receives the stripping pin and nest pin, the nest pin being biased.

13. The tool changer of claim 1, further comprising a vacuum or compression connection between the master half and the tool half with a bore in the master half and a bore in the tool half providing fluid passage between the two and channels outside of the bore for receiving seals so that in operation the seals are face to face providing sealing.

14. The tool changer of claim 13, wherein the channels includes a retention mechanism retaining the seal in the channel.

15. The tool changer of claim 13, wherein the seals are annular rings with cross sections that are circular, quad, rectangular or the like.

16. The tool changer of claim 1, further comprising a vacuum or compression connection between the master half and the tool half with a bore in the master half and a bore in the tool half providing fluid passage and a channel in one of the bores for receiving a seal and a tube extending from the other bore, when the master half and tool half are coupled together, the tube extends into the seal so that the seal is not broken if the master half and tool half separate slightly under load.

17. The tool changer of claim 16, wherein the seal is a U-shaped cup seal.

18. A tool changer comprising:
a master half and a tool half, the master half to be coupled with a robot, the tool half to be coupled with a tool;
a mechanism for securing the master and tool halves with one another, the securing mechanism including a clasp moving between a release position and a grasping position, and a cam plate for moving the clasp between the release position and the grasping position, wherein when the clasp is in the grasping position, the master half and the tool half are secured together with one another;

a lock coupled with the cam plate, and when the master half and the tool half are to be secured together, the master half approaches the tool half, the master half engages with the tool half for securement, the lock is actuated and pivots the cam plate and moves the clasp from its release position to its grasping position, wherein the lock moves into a locked position thereby locking the master half and the tool half together; and a lock sensor determining position of the lock during operation.

19. The tool changer of claim 18, wherein the lock sensor includes a plurality of sensors sensing the position of the lock.

20. The tool changer of claim 18, wherein the lock sensor is electrically coupled with controls of a robot.

\* \* \* \* \*